INVENTORS.
John Karpovich
Willard F. Clark
BY

ATTORNEY

United States Patent Office 3,239,585
Patented Mar. 8, 1966

3,239,585
SHOCK TREATMENT OF PLASTIC FOAMS
John Karpovich and Willard F. Clark, Midland, Mich., assignors to The Dow Chemical Company, Midland, Mich., a corporation of Delaware
Filed May 11, 1962, Ser. No. 194,137
9 Claims. (Cl. 264—84)

This invention relates generally to a method for opening cells of plastic foams and, more particularly, relates to a method for the shock treatment of normally closed cell plastic foams so as to greatly enhance their sound absorbency and other qualities. This invention further relates to novel plastic foam structures having high sound absorption capacities.

Prior to the present invention it has been a characteristic of normally closed cell plastic foams, such as polystyrene and rigid urethane foams, that they have only a relatively slight degree of sound absorption capacity. They also generally fracture when anything beyond the minimal flexing stresses are applied thereto. Prior attempts to open the cell structure of such foams have particularly failed to increase the sound absorption capacity thereof. When such foams have been subjected to pressures between rollers, as for example illustrated in U.S. Patent 1,045,234, no appreciable increase in sound absorption qualities can be noted.

Accordingly, it is an object of the present invention to provide a method for increasing the sound absorbency of normally closed cell plastic foams.

It is still another object of the present invention to provide a method for increasing the sound absorbency of plastic foams by opening at least a portion of their cell structures in a novel manner.

It is a further object of the present invention to provide a method whereby cells of plastic foams are opened in a relatively uniform manner.

Still another object of the present invention is to provide a shock impact type method for opening cells in plastic foams.

And still another object of the present invention is to provide a method wherein the compressive strength of plastic foams can be controlled by regulating the percentage of open cells therein.

Briefly then, the present invention relates to a discovery wherein it has been found that a properly applied shock impact treatment of plastic foams results in an opening of the cell structure thereof in a manner such that their sound absorption properties are greatly enhanced. Along with the increase in sound absorption capacity are the incidental increases in flexibility, resiliency, and water absorption capacity. Furthermore, by employing this invention regulation of the percentage of open cells in a particular foam material can be had so as to provide a given foam material with a specific compressive strength.

Yet additional objects and advantages of the present invention, and its numerous cognate benefits and features, are even more apparent and manifest in and by the ensuing description and specification taken in conjunction with the accompanying drawing in which, wheresoever possible, like characters of reference designate corresponding material and parts throughout the several views thereof, in which.

It has been found that closed cells of plastic foams can be opened up with shock waves. These shock waves open the foam cells in a peculiar manner heretofore unknown in the art, so as to give unusual results. This particular opening of the cell walls can be referred to as the brittle fracture thereof resulting from the sudden impact of shock waves. The effect of such brittle fracture will be discussed in more detail hereinafter.

Figure 1:
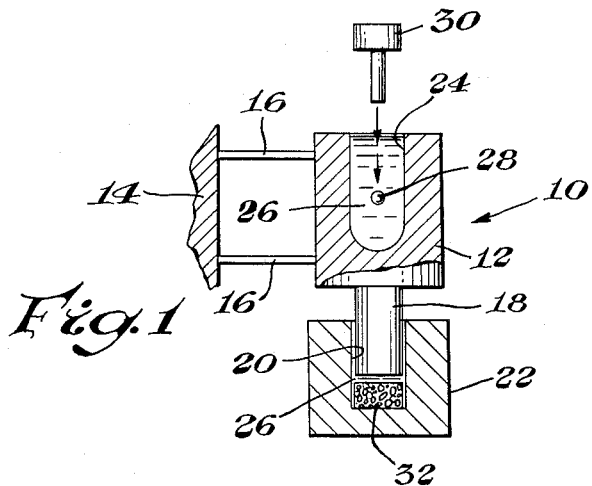
FIGURE 1 is a cross-sectional view of one arrangement of apparatus for performing the method of the present invention.

One embodiment for imparting a generally uniform brittle fracture to a foam sample body is illustrated as arrangement 10 in FIGURE 1. Here a tank type piston 12 is supportd by a wall 14 through resilient supports 16 and includes a nose or projection 18 for mating with a cavity 20 in a mold 22. A vessel portion 24 formed in the top section of piston 12 contains a liquid bath 26. Likewise the cavity 20 in the mold 22 contains a liquid bath 26. The liquid bath 26 can be formed of water or of other fluid materials such as mineral oil, carbon tetrachloride, silicon oil, fluorinated hydrocarbons, aqueous salt solutions, and the like. A shock wave is introduced into the cavity 20 by means of a projectile 28 fired from a gun 30 or its equivalent. That is, projectile 28 imparts its energy to piston 12 by entering vessel 24 and nose 18 in turn transmits the energy of piston 12 to the liquid 26 in cavity 20 where it is impacted, by shock waves, upon foam plastic section 32. A typical gun 30 can be a .45 caliber pistol of a .38 special, or a 12 gauge shortgun, or a 30/06 rifle. For example, a ballistic projectile delivering about 3000 foot-pounds of energy will be satisfactory with water as the liquid where the foam is located closely adjacent to the impact and is of a reasonable size, such as up to about 4 inches for polystyrene foam.

Figure 2:
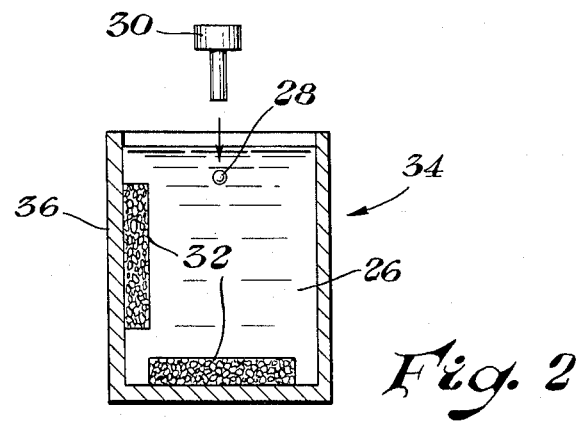
FIGURE 2 is a cross-sectional view of another apparatus for performing the method of the present invention.

Another embodiment of the method of the present invention is illustrated as arrangement 34 of FIGURE 2. Here foam plastic sections 32 are placed on the bottom and sides of a vessel 36 after which liquid 26 is placed in the vessel. Similar to arrangement 10 of FIGURE 1, a gun 30 fires a projectile 28 into a liquid bath 26 to set up shock waves which impinge upon the foam plastic sections 32. Although it is not necessary that the sections 32 touch the walls of the vessel 36, it has been found that more effective brittle fracture can occur if the sections 32 do contact the walls so as to be provided with a rigid backing. A specific experiment employed a steel vessel 36 having a height of 4 feet and a diameter of 12 inches with a wall thickness of ¼ inch. Water was employed as the liquid 26 and the projectile 28 was fired from a .30 caliber rifle to impart favorable opening of the cell walls of a 2 inch polystyrene foam board.

Figure 3:
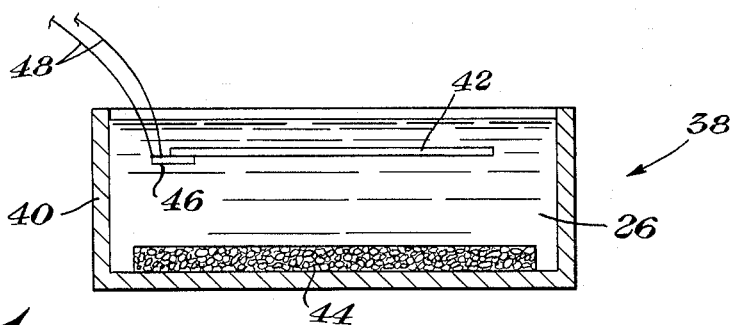
FIGURE 3 is a cross-sectional view of yet another apparatus for performing the method of the present invention.

Still another way of imparting a high impact shock wave is illustrated as arrangement 38 of FIGURE 3. Here a vessel 40 contains a liquid 26 in which an explosive Primacord 42 is placed generally over the length of a foam section 44. A blasting cap 46 including leads 48 is attached to the Primacord 42 for initiation purposes. The shock wave produced by the explosion of the Primacord results in a distribution of the shock wave over the entire length of the foam section. It is comprehended that by the use of explosives, such as ammonium nitrate, that huge quantities of foam can be treated at a single time in large bodies of water such as found in lakes and the like.

Figure 4:
FIGURE 4 is a view through a microscope of the cell structure of a foam before treatment by the method of the present invention.
Figure 5:
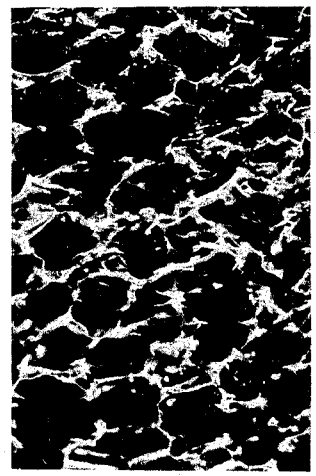
FIGURE 5 is a view through a microscope of the cell structure of the foam of FIGURE 4 after treatment by the method of the present invention.

A particular sample of about two inch thick polystyrene foam board was tested employing the apparatus 34 of FIGURE 2 at a temperature slightly below 70° C. FIGURE 4 is a photographic illustration, magnified twenty times, of the cell structure of this particular polystyrene foam sample before treatment according to the method of the present invention. FIGURE 5 is a similar magnified photographic illustration of the same sample after treatment according to the method of the present invention and clearly illustrating a uniform fracture of the cell walls which results in the high acoustical properties desired. The particular thickness of foam which can have its cell walls fractured substantially uniformly throughout is directly dependent upon the quantity of energy released by the shock impact. Using the apparatus of FIGURE 2 as described above, it has been found that uniform fracture can occur in polystyrene foam boards of a thickness from two to four inches.

Figure 6:
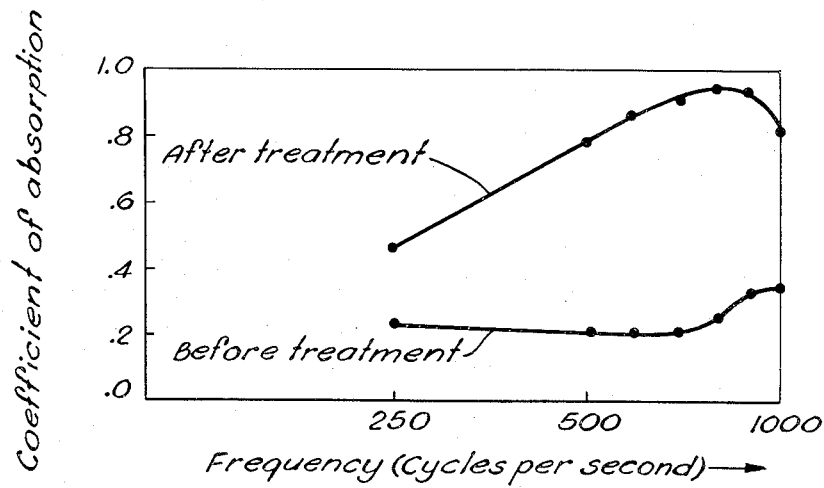
FIGURE 6 is a graphic illustration of the plastic foams sound absorption capacity as related to FIGURES 4 and 5.

It can be seen by comparing the acoustical properties of the aforementioned sample before and after treatment, as indicated in FIGURE 6, that the coefficient of sound absorption had increased substantially for the shock impact treated polystyrene foam board. For example, at a sound wave frequency of 500 cycles per second the foam only had a sound absorbency coefficient of about 0.22 before treatment but of about 0.78 after treatment, or better than a three-fold increase in sound absorption capacity. A standard impedance tube was used in testing the foam sample.

The treated polystyrene foam appears to exhibit inextensional buckling as well as cell wall fracture. This type of buckling is identifiable by the formation of characteristic diamond-shape buckles and is considered the lowest energy form of buckling since the material which buckles neither expands nor contracts. The combined action of cell wall brittle fracture and inextensional buckling is believed to result in the decreased dimensions of a foam sample after it is treated by shock impact. For example, in the two-inch sample discussed above, after a first shot its height was reduced to $1\tfrac{15}{16}$ inches; after a second shot its height was reduced to $1\tfrac{7}{16}$ inches; and after a third shot its height was reduced to ⅞ of an inch. Corresponding decreases occurred in other dimensions also. One peculiarity of the process, however, is that when polystyrene foam is heated to a temperature over 75° C. and treated ballistically according to the principles of the present invention, inextensional buckling will still occur only accompanied with somewhat less fracture of cell walls. Acoustical properties are not generally improved by treatment at temperatures above 75° C. although the foam is made substantially more flexible. However, even though temperatures below 75° C. are preferred for the best results, temperature is not the greatest factor. For example, it has been found that a given sample of foam treated at −80° C. ended up with 95% open cells while a similar piece of foam treated under the same conditions, except at a temperature of 80° C., ended up with 86% open cells.

It can readily be understood that the amount of shock impact applied to a foam will determine the percentage of cells opened in the foam. Thus, since the compressive strength of foam decreases when the percentage of open cells is increased, the particular compressive strength of a foam can be controlled by regulating the amount of shock impact applied thereto.

To achieve a proper brittle fracture of the cell walls to increase the sound absorbency thereof, it is important that the rate at which the shock impact is applied is great enough that the skeletal structure thereof does not have time to move substantially between the initial and final applications of the shock energy. Stated another way, it is important that the impact be great enough to exceed the dynamic yield strength of the particular foam involved under conditions of a high stress rate. Although this invention has primarily been directed towards the relatively inexpensive polystyreen foams, it is to be understood that it is intended to also include within its scope other foam materials, such as a polyethylene and polyurethane, which will similarly respond to the same or similar treatment.

While certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. A method for substantially increasing the acoustical absorption properties of a polystyrene foam block up to about 4 inches thick, said method comprising immersing said block in a body of non-solvent aqueous liquid, and suddenly impacting said liquid adjacent said block with about 3000 foot-pounds of energy.

2. A method for substantially increasing the acoustical absorption properties of a plastic foam block, said method comprising the steps of immersing said block in a non-solvent aqueous liquid contained in a vessel, locating said block such that at least one surface thereof is in contact with one of the vessel walls, and subjecting said liquid to shock impact adjacent said block great enough to exceed the dynamic yield strength and rupture without disintegrating the skeletal structure of a substantial portion of said cells.

3. A method for opening the cells of a plastic foam body comprising the steps of immersing said foam body in a non-solvent liquid and subjecting said foam body to a shock impact imparted to said liquid great enough to exceed the dynamic yield strength and rupture without disintegrating the skeletal structure of a substantial portion of said cells.

4. The method of claim 3 wherein said liquid is an aqueous fluid kept below about 75° C.

5. The method of claim 4 wherein said shock impact is imparted by firing a high-speed projectile into said liquid.

6. The method of claim 5 wherein said shock impact is imparted closely adjacent said foam body and is of a magnitude of about 3000 foot-pounds of energy.

7. The method of claim 6 wherein the foam body is formed of a polystyrene material.

8. The method of claim 3 wherein said shock impact is imparted by a fast moving piston travelling through said liquid generally above said foam body.

9. The method of claim 3 wherein said shock impact is imparted by initiating an explosive charge in said liquid adjacent said foam body.

References Cited by the Examiner

UNITED STATES PATENTS

| | | | |
|---|---|---|---|
| 2,200,155 | 5/1940 | Camp et al. | 264—70 XR |
| 2,648,125 | 8/1953 | McKenna et al. | 264—84 |
| 2,744,291 | 5/1956 | Stastny et al. | 18—485 |
| 2,848,428 | 8/1958 | Rubens | 260—2.5 |
| 2,872,682 | 2/1959 | Maier | 264—84 |
| 2,877,192 | 3/1959 | Burkus | 260—2.5 |
| 2,894,919 | 7/1959 | Simon et al. | 260—2.5 |
| 2,961,710 | 11/1960 | Stark | 264—321 XR |
| 3,042,973 | 7/1962 | Brockhues et al. | 18—485 |
| 3,044,430 | 7/1962 | Zeigler | 264—84 |
| 3,072,584 | 1/1963 | Karpovich | 264—23 |
| 3,125,617 | 3/1964 | Hoppe | 264—54 |

FOREIGN PATENTS

| | | |
|---|---|---|
| 620,248 | 5/1961 | Canada. |
| 716,422 | 10/1954 | Great Britain. |
| 829,912 | 3/1960 | Great Britain. |
| 880,513 | 10/1961 | Great Britain. |

ALEXANDER H. BRODMERKEL, *Primary Examiner.*

LEON J. BERCOVITZ, *Examiner.*